(12) United States Patent
Kang et al.

(10) Patent No.: US 7,450,557 B2
(45) Date of Patent: Nov. 11, 2008

(54) WIRELESS COMMUNICATION DEVICE, WIRELESS COMMUNICATION SYSTEM USING THE SAME, AND COMMUNICATION METHOD THEREFOR

(75) Inventors: Hyun-Sook Kang, Yongin (KR); Tae-Jin Lee, Anyang (KR); Jong-Hun Park, Kwacheon (KR); Kyung-Hun Jang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 1203 days.

(21) Appl. No.: 09/901,153

(22) Filed: Jul. 10, 2001

(65) Prior Publication Data

US 2002/0089963 A1    Jul. 11, 2002

(30) Foreign Application Priority Data

Jan. 8, 2001    (KR) .................................. 2001-964

(51) Int. Cl.
*H04J 3/00*    (2006.01)
(52) U.S. Cl. .................... 370/345; 370/346; 370/347
(58) Field of Classification Search ................ 370/310, 370/312, 313, 315, 329, 340, 341, 346, 349, 370/386, 392, 402, 432, 449, 487, 327; 455/500, 455/507, 517, 518, 519
See application file for complete search history.

(56) References Cited

U.S. PATENT DOCUMENTS 6,275,500 B1 *   8/2001   Callaway et al. ............ 370/449
6,590,928 B1 *   7/2003   Haartsen ..................... 375/134
6,691,173 B2 *   2/2004   Morris et al. ............... 709/249

(Continued)

FOREIGN PATENT DOCUMENTS

EP    1 107 520 A1    6/2001

(Continued)

OTHER PUBLICATIONS

"Specification of the Bluetooth System, Specification vol. 1, Wireless Connections made easy, Core, V1.0 B, pp. 1, 47-66, 143-178, chapters 4. Packets, 13. Bluetooth Addressing, 14. Bluetooth Security" Specification of the Bluetooth System, XX, XX, Dec. 1, 1999.

(Continued)

*Primary Examiner*—Phirin Sam
(74) *Attorney, Agent, or Firm*—Sughrue Mion, PLLC

(57) ABSTRACT

A wireless communication device, a wireless communication system using the same, and a communication method therefor are provided. When a wireless communication device operated as a slave intends to communicate with other slave communication devices, the communication-intending slave device transmits a packet where an address of a destination slave device is recorded in a header region as a destination address to the wireless communication device operated as a master. When the address recorded in the header region of the packet is an address of another slave device, not the communication-intending slave device, the master device transmits the packet to the wireless communication device of the destination address. Accordingly, the communication is performed using the address recorded in the header region of the transmitted packet as the destination address. As a result, peer-to-peer communication between the slave devices is performed, without increasing a data processing load in the Bluetooth communication.

18 Claims, 6 Drawing Sheets

U.S. PATENT DOCUMENTS

| | | |
|---|---|---|
| 6,775,258 B1* | 8/2004 | van Valkenburg et al. ... 370/338 |
| 7,161,941 B1* | 1/2007 | Schmidl et al. ............. 370/392 |
| 2001/0002906 A1* | 6/2001 | Rune ........................ 370/345 |
| 2001/0002912 A1* | 6/2001 | Tony et al. ................. 370/487 |
| 2002/0022453 A1* | 2/2002 | Balog et al. ................. 455/41 |
| 2002/0044549 A1* | 4/2002 | Johansson et al. ........... 370/386 |
| 2002/0061009 A1* | 5/2002 | Sorensen ................... 370/351 |
| 2002/0075940 A1* | 6/2002 | Haartsen .................... 375/132 |
| 2002/0096576 A1* | 7/2002 | Kluczynski ................. 239/51 |
| 2002/0196771 A1* | 12/2002 | Vij et al. .................... 370/349 |
| 2003/0036350 A1* | 2/2003 | Jonsson et al. ............... 455/41 |
| 2003/0076842 A1* | 4/2003 | Johansson et al. ........... 370/401 |

FOREIGN PATENT DOCUMENTS

| | | |
|---|---|---|
| WO | WO 99/14897 A2 | 3/1999 |

OTHER PUBLICATIONS

"PHS Packet Communications", by Taketsugu et al,, The Institute of Electronics, Information and Communication Engineers; Technical Report of IEICE; pp. 60-68 Sep. 25, 1996.

* cited by examiner

PEER-TO-PEER COMMUNICATION

WIRELESS COMMUNICATION DEVICE, WIRELESS COMMUNICATION SYSTEM USING THE SAME, AND COMMUNICATION METHOD THEREFOR

FIELD OF THE INVENTION

The present invention relates to a wireless communication device, a wireless communication system using the same, and a communication method therefor, and in particular to a wireless communication device supporting a peer-to-peer communication, a wireless communication system using the same, and a communication method therefor. The present application is based on Korean Patent Application No. 2001-964, which is incorporated herein by reference.

DESCRIPTION OF THE RELATED ART

FIG. 1 illustrates a structure of a Piconet in a conventional Bluetooth communication system.

As shown in FIG. 1, in the Bluetooth communication system, a plurality of slave devices $S_{10}$, $S_{20}$, $S_{30}$, $S_{40}$ are connected to one master device $M_{10}$. A network where at least one slave device is connected to one master device is called a Piconet. In the Piconet, seven slave devices can be maximally connected to the master device in an active state.

The master device $M_{10}$ communicates with the slave devices $S_{10}$, $S_{20}$, $S_{30}$, $S_{40}$ through packets in the Piconet.

The current Bluetooth communication employs a master driven time division duplex (TDD) type wherein the master device transmits a designated packet to a specific slave device, and the slave device transmits a data-recorded packet to the master device. Since the slave devices transmit data exclusively to the master device, the slave devices do not record a designation address in the packet to be transmitted. Only a source address, i.e., a transmission source of the slave device is recorded in the packet.

FIG. 2a illustrates a structure of a conventional packet transmitted in the Piconet in FIG. 1, and FIG. 2b illustrates in detail a header region of FIG. 2a.

As shown therein, the conventional packet includes an access region, a head region and a payload region. An address of the slave device transmitting the packet, namely an active member address AM_ADDR allocated by the master device is recorded in the header region. Here, the active member address is a 3-bit address which the master device allocates to distinguish the respective slave devices, when the slave devices are connected in the active state in the Piconet.

Accordingly, when the master device transmits the packet where the address of the slave device is recorded in the AM_ADDR portion of the header region, the corresponding slave device transmits to the master device a response packet where its slave address is recorded in the AM_ADDR portion of the header region. Therefore, the master device or slave device judges whether the packet is transmitted to itself, by analyzing the header region of the packet received.

However, when the peer-to-peer communication, namely the communication between the slave devices, is performed in the current Bluetooth communication system using the packet structure, there are the following problems.

The Bluetooth communication system uses the master driven TDD type. When one slave device intends to transmit data to another slave device, the slave device cannot record its destination address in the header region of the packet.

Accordingly, in order to perform peer-to-peer communication while maintaining the packet structure, there has been suggested a method for additionally recording an address of the slave device to which the packet is transmitted, namely a 48-bit Bluetooth device address BD_ADDR in the payload region of the packet, so that the master device can distinguish a destination of the packet.

However, in the case that the BD_ADDR of the destination slave device is recorded in the payload region of the packet as the destination address, the master device must analyze the payload region, which increases a data processing load.

In addition, when the communication is performed by employing DM1 packet transmitting one packet in one slot, the payload region has 6 bytes of overhead among 17 bytes, thus reducing a data recording rate of each packet. As a result, communication speed is also decreased.

SUMMARY OF THE INVENTION

The present invention is proposed to solve the foregoing problems, and it is therefore an object of the invention to provide a wireless communication device supporting a peer-to-peer communication without increasing a packet analysis load, a wireless communication system using the same, and a communication method therefor.

In order to achieve the above-described object of the present invention, in a wireless communication device of a wireless communication system having at least one slave device, and a master device that is connected to the slave device and that has information of addresses allocated to the slave devices, the communication device includes a transceiving unit for receiving external data, and transmitting a transmission-destined signal; and a controller, when the wireless communication device is operated as a slave device connected to the master device and the slave device intends to communicate with another slave device, for generating a packet where an address of a destination slave device received from the master device through the transceiving unit is recorded in a destination address region, and for transmitting the packet through the transceiving unit to the destination slave device through the master device.

Preferably, the controller records the address of the destination slave device which is a destination address in a header region of the packet.

In addition, the controller records a source address in a payload region of the packet.

According to another aspect of the present invention, in a wireless communication device of a wireless communication system having at least one slave device, and a master device that is connected to the slave device and that has information of addresses allocated to the slave devices, the wireless communication device includes a transceiving unit for receiving external data, and transmitting a transmission-destined signal; and a controller, when the wireless communication device is operated as a master device connected to at least one slave device, for reading the packet received from the transceiving unit and transmitting the packet to the corresponding slave device through the transceiving unit if there is an address of the slave device recorded in a destination address region of the packet.

Preferably, the controller recognizes the address recorded in a header region of the packet as a destination address.

In addition, there is provided a wireless communication system having at least one slave device, and a master device that is connected to the slave device and that has information of addresses allocated to the slave devices, wherein the slave device obtains an address of the destination slave device from the master device, generates a packet including the address of the destination slave device as a destination address and its address as a source address, and transmits the packet to the master device, and the master device reads the received packet, and transmits the packet to the slave device of the destination address, when the address recorded in a destination address region of the packet is the address of the slave device.

Preferably, the slave device records the address of the destination slave device in a header region of the packet, and the master device recognizes the information recorded in the header region of the packet as the destination address.

There is also provided a communication method for a wireless communication system having at least one slave device, and a master device that is connected to the slave device and that has information of addresses allocated to the slave devices, the communication method including the steps of: obtaining an address of the destination slave device from the master device; generating a packet including the address of the destination slave device as a destination address and its address as a source address; and transmitting the packet to the master device so that the packet can be transmitted to the destination slave device through the master device according to the destination address recorded on the packet.

According to still another aspect of the present invention, there is provided a communication method for a wireless communication system having at least one slave device, and a master device that is connected to the slave device and that has information of addresses allocated to the slave devices, the communication method including the step of the master device analyzing a packet from the slave device; and the step of the master device transmitting the packet to the slave device of a destination address, when an address recorded in a destination address region of the packet is the address of the slave device.

BRIEF DESCRIPTION OF THE DRAWINGS

FIG. 2a illustrates a structure of a conventional packet to be transmitted in the Piconet in FIG. 1;

FIG. 2b illustrates a detailed header region in FIG. 2a;

DETAILED DESCRIPTION OF THE PREFERRED EMBODIMENT

A wireless communication device, a wireless communication system using the same, and a communication method therefor in accordance with a preferred embodiment of the present invention will now be described in detail with reference to the accompanying drawings.

First of all, the wireless communication device applied to the Bluetooth communication will now be explained.

According to the Bluetooth communication, the wireless communication device is operated as a master or slave. When the wireless communication device is operated as the master, it is called a master device. In addition, when the wireless communication device is operated as the slave, it is called a slave device.

Figure 1:
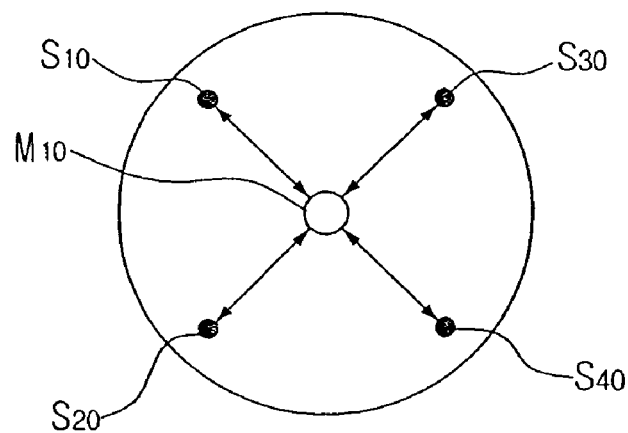
FIG. 1 illustrates a structure of a Piconet in a conventional Bluetooth communication system.
Figure 2:
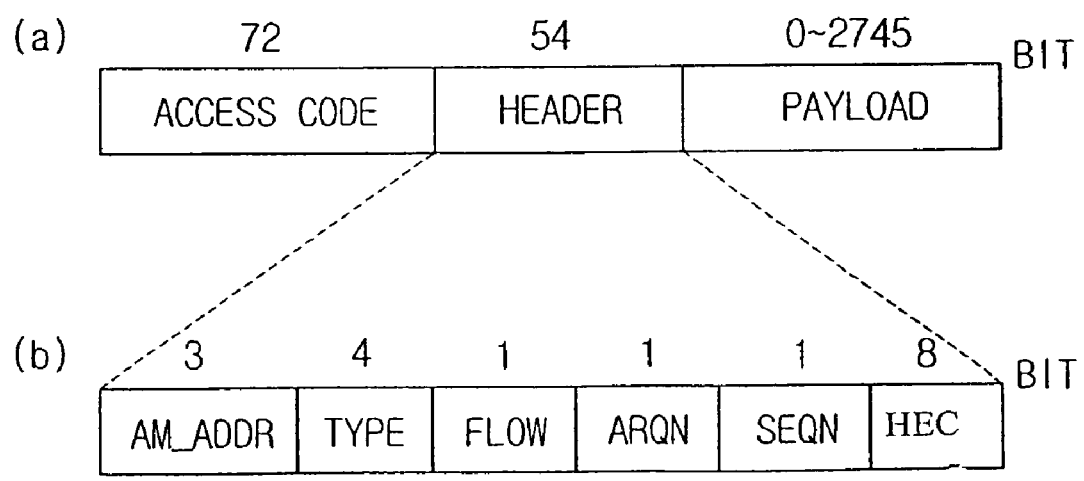
Figure 3:
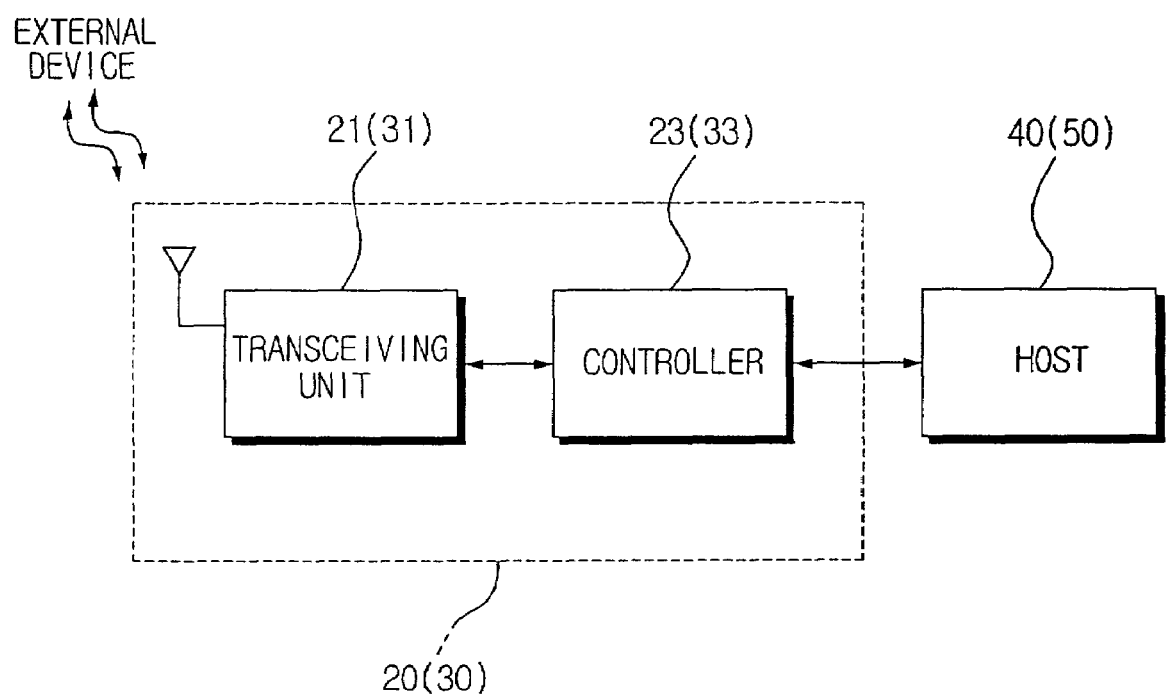
FIG. 3 is a block diagram illustrating a wireless communication device in accordance with the present invention.

FIG. 3 is a block diagram illustrating the wireless communication device in accordance with the present invention.

Referring to FIG. 3, the wireless communication devices 20, 30 respectively include transceiving units 21, 31 and controllers 23, 33. At this time, reference numerals 20, 21, 23, 40 denote the wireless communication device operated as the slave, and components thereof, and reference numerals 30, 31, 33, 50 denote the wireless communication device operated as the master, and components thereof.

First, the wireless communication device 20 operated as the slave will now be described.

The transceiving unit 21 processes an external signal, for example an RF signal, and externally transmits a transmission destination packet.

The controller 23 is connected to a host 40 through a communication interface. Here, various types of communication terminals such as a laptop computer, a cellular phone and a printer may be used as the host 40.

The controller 23 processes a signal demanded by the host 40, and a signal received through the transceiving unit 21.

Figure 4:
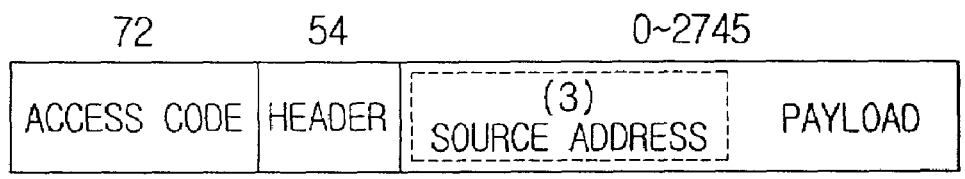
FIG. 4 illustrates a structure of a packet transmitted by the wireless communication device in FIG. 3 in a peer-to-peer communication.

In addition, when the wireless communication device 20 forms a wireless network with another wireless communication device, and is operated as the active slave for communicating with the destination slave device, namely for performing the peer-to-peer communication, the controller 23 generates a packet where an address of the destination slave device received from the master device through the transceiving unit 21 is recorded as a destination address, and externally transmits the packet through the transceiving unit 21. As illustrated in FIG. 4, the controller 23 preferably generates the packet having an access code region, a header region and a payload region, and records the destination address in the header region of the packet.

The controller 23 records a source address allocated by the master device, namely an active member address AM_ADDR in the payload region of the packet. Preferably, the active member address is represented by less than 3 bits.

Figure 5:
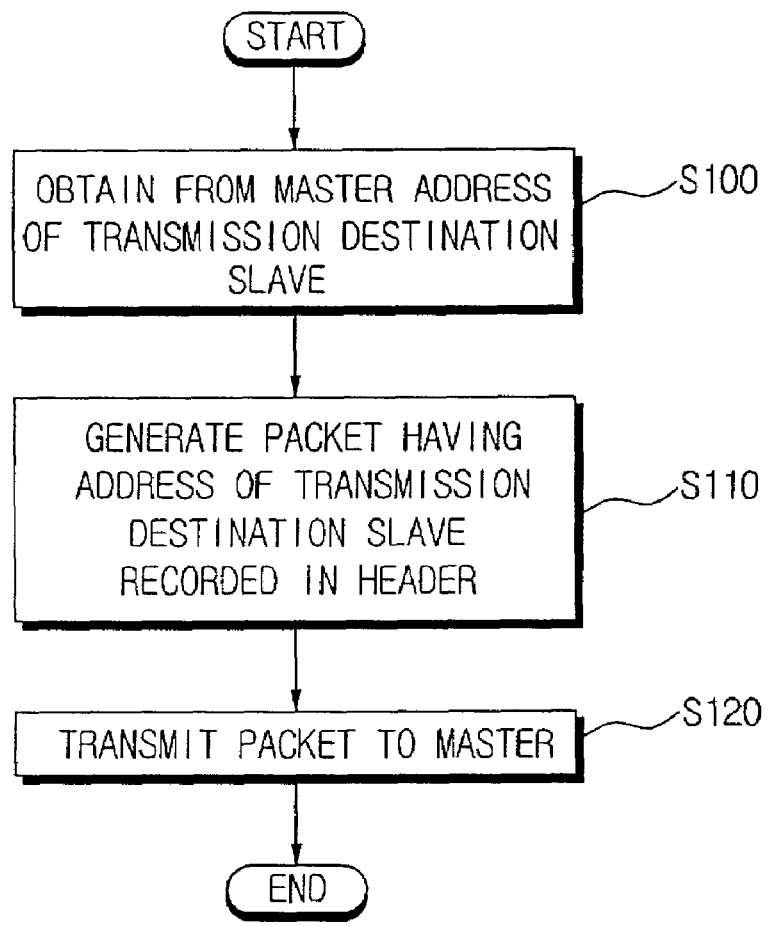
FIG. 5 is a flowchart showing the peer-to-peer communication performed by the wireless communication device in FIG. 3 during the slave operation.

FIG. 5 is a flowchart showing the peer-to-peer communication performed by the wireless communication device 20 operating as a slave device.

As shown in FIG. 5, the slave device obtains the address of the destination slave device from the master device (S100).

Thereafter, the slave device generates a packet where the address of the destination slave device is recorded in the header region (S110), and transmits the packet to the master device (S120).

On the other hand, the wireless communication device 30 operating as the master will now be described.

The transceiving unit 31 processes an external signal, for example an RF signal, and externally transmits a transmission destination packet.

The controller 33 is connected to a host 50 through a communication interface. Here, various types of communication terminals such as a laptop computer, a cellular phone and a printer may be used as the host 50.

The controller 33 processes a signal requested by the host 50, and a signal received through the transceiving unit 31.

In addition, the controller 33 maintains a connection state with at least one slave device, and is operated as the master for reading the packet received from the transmission slave device through the transceiving unit 31. When the address of the slave device is recorded in the destination address region of the packet, the controller 33 transmits the packet to the corresponding slave device through the transceiving unit 31.

Here, the controller 33 analyzes the received packet as having a structure shown in FIG. 4. That is, the controller 33 recognizes the address recorded in the header region of the packet as the destination address, and recognizes the 3-bit information in the payload region of the packet as the address of the transmission slave device. Actually, when the address of the slave device is recorded in the header region, the controller 33 does not need to analyze the payload region.

Figure 6:
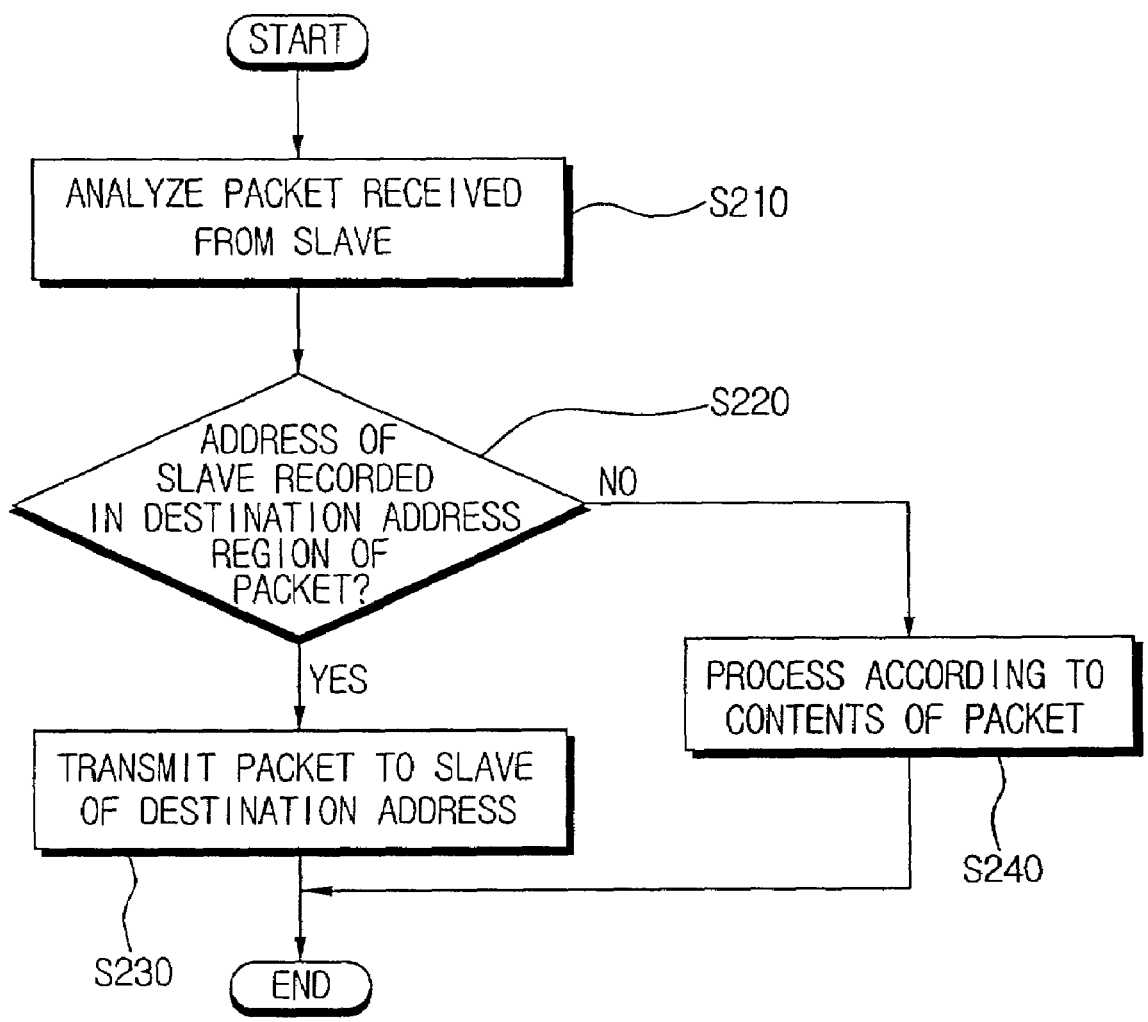
FIG. 6 is a flowchart showing the peer-to-peer communication supported by the wireless communication device in FIG. 3 during the master operation.

FIG. 6 is a flowchart showing the peer-to-peer communication supported by the wireless communication device 30 operating as the master.

As shown in FIG. 6, the master device analyzes the packet received from the slave device 20 (S210).

When the master device recognizes the address of the destination slave device, without the address of the master or the source slave device, recorded in the destination address region, namely the header region of the packet (S220), the master device transmits the packet to the slave device of the destination address (S230).

When the address of the destination slave device is not recorded in the destination address region, the master device is operated according to the contents of the packet (S240). That is, when the source address or a designated code is recorded in the destination address region, the master device performs the corresponding process.

When the wireless communication devices 20, 30 perform the communication by using a new type of packet, the following items are preferably suggested.

First, the AM_ADDR of the master device is set up as '111', and the AM_ADDR of the broadcast packet is set up as '000'.

Second, the master device allocates the addresses except for '111' and '000' to the respective active slave devices.

Third, when one slave device intends to communicate with another slave device, the slave device obtains the AM_ADDR of the destination slave device from the master device.

Fourth, the master or slave device records the address of the final destination slave device in the AM_ADDR portion of the header region of the packet.

Fifth, the address of the slave device transmitting the packet is recorded in the payload region of the packet.

Lastly, when the address of the destination slave device is recorded in the AM_ADDR of the packet from the transmission slave device, the master device transmits the packet to the destination slave device.

On the other hand, the communication between the wireless communication devices using the packet structure will now be explained in more detail.

Figure 7:
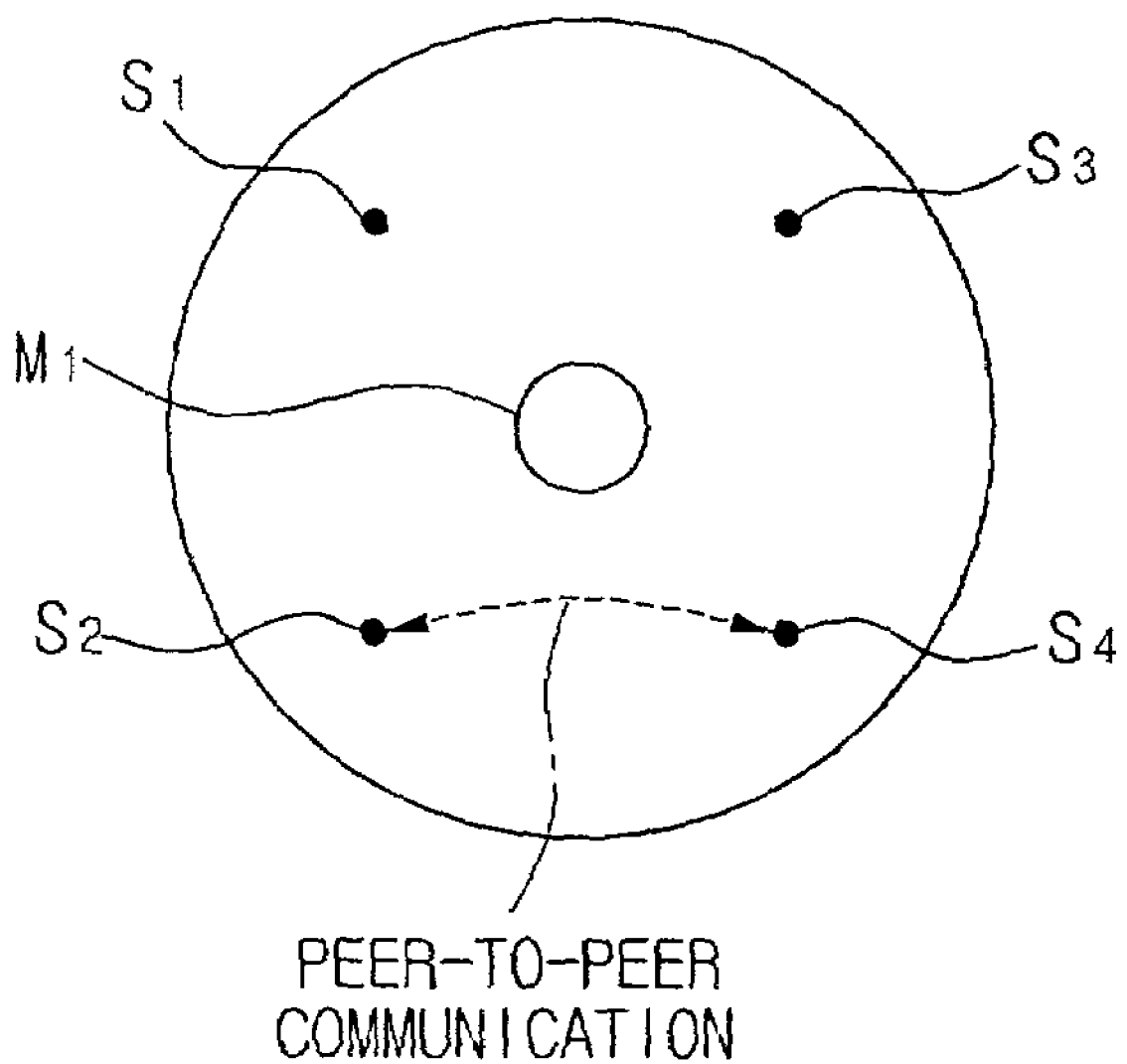
FIG. 7 illustrates the peer-to-peer communication in a wireless communication system using the wireless communication device in FIG. 3.

FIG. 7 illustrates the peer-to-peer communication in a wireless communication system where the wireless communication devices shown in FIG. 3 form the Piconet.

Here, reference numeral $M_1$ denotes the wireless communication device 30 operated as the master (abbreviated as 'master device'), and $S_1$ to $S_4$ denote the wireless communication devices 20 operated as the slaves (abbreviated as 'slave devices').

The master device $M_1$ is connected to the plurality of slave devices $S_1$, $S_2$, $S_3$, $S_4$ to form the Piconet.

Figure 8:
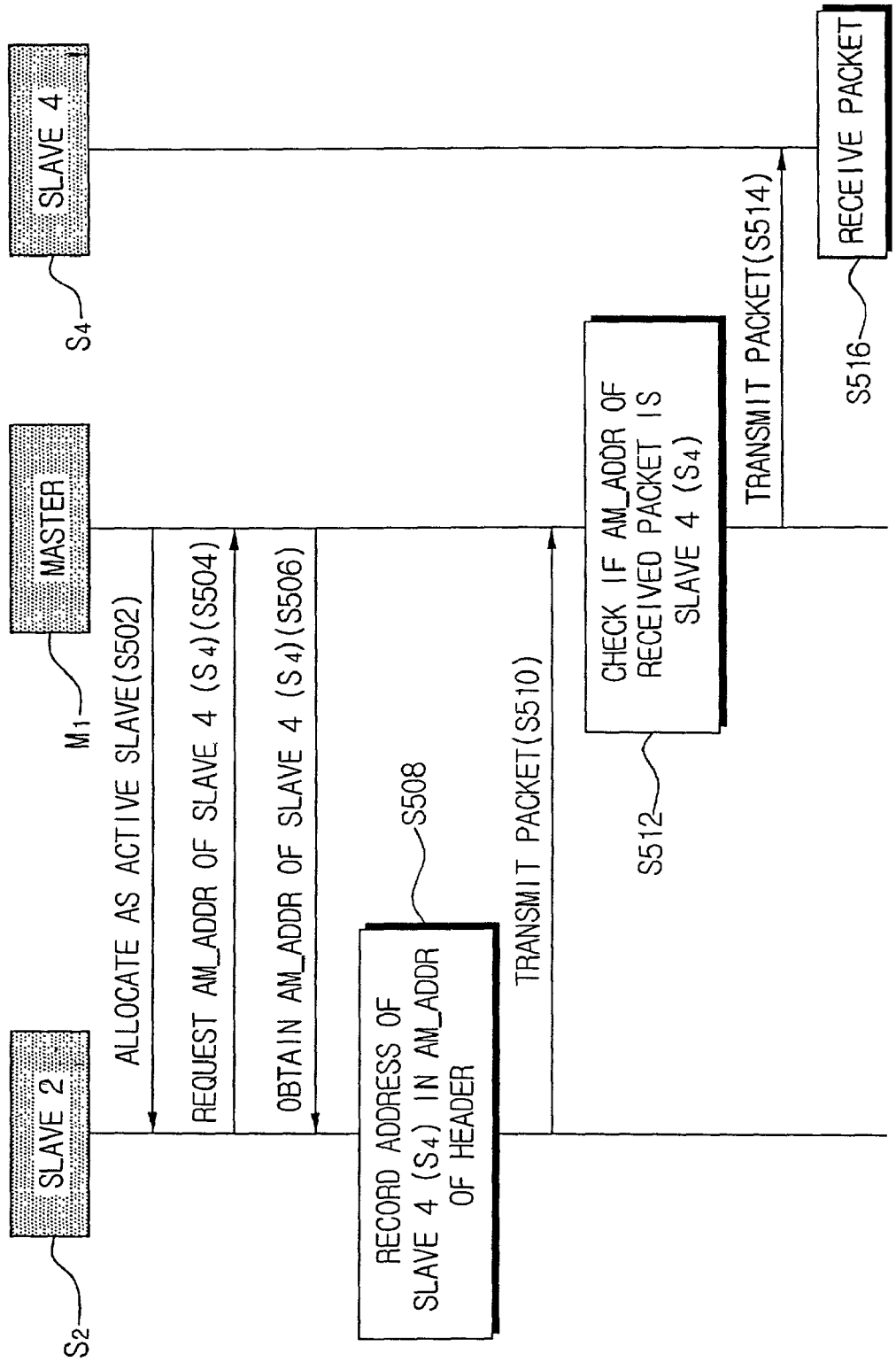
FIG. 8 is a flowchart showing the detailed peer-to-peer communication in the wireless communication system in FIG. 7.

The communication between the slave devices $S_2$, $S_4$ indicated by a dotted arrow will now be described with reference to FIG. 8.

First, the master device $M_1$ designates the slave device $S_2$ as an active slave (S502).

When the active slave device $S_2$ intends to communicate with the slave device $S_4$, the slave device $S_2$ requests the master device $M_1$ for the AM_ADDR of the slave device $S_4$ (S504). The master device $M_1$ provides the slave device $S_2$ with the AM_ADDR of the slave device $S_4$ (S506).

The slave device $S_2$ generates a packet where the address of the destination slave device $S_4$ is recorded in the AM_ADDR portion of the header region, and the source address allocated by the master device $M_1$ is recorded in the payload region (S508).

Thereafter, the slave device $S_2$ transmits the packet to the master device $M_1$ (S510).

The master device $M_1$ confirms that the address of the slave device $S_4$ is recorded in the AM_ADDR portion of the header region in the packet received (S512), and transmits the packet to the slave device $S_4$ (S514).

The slave device $S_4$ receives the packet from the slave device $S_2$ through the master device $M_1$ (S516).

The slave device $S_4$ confirms its address in the header region of the packet, and processes reception of the packet. In addition, the slave device $S_4$ can recognize the slave device transmitting the packet by the source address recorded in the payload region of the packet.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, in accordance with the present invention, the communication is performed by using the address recorded in the header region of the packet as the destination address. As a result, the peer-to-peer communication between the slave devices can be performed, not increasing a data processing load in the Bluetooth communication.

What is claimed is:

1. A wireless communication device of a wireless communication system having at least one slave device, and a single master device that is connected to the slave device and that has information of addresses allocated to the slave devices, the wireless communication device comprising:

a transceiving unit for receiving an external data, and transmitting a transmission-destined signal; and a controller which, when the wireless communication device is operated as a slave device connected to the single master device and the slave device intends to communicate with another slave device, generates a packet where an address of a destination slave device received from the single master device through the transceiving unit is recorded in a destination address region, and transmits the packet through the transceiving unit to the destination slave device only through the single master device, wherein the packet includes a destination address in a header region of the packet and a source address in a payload region of the pack.

2. The device according to claim 1, wherein the controller records the address of the destination slave device in a header region of the packet.

3. A wireless communication device of a wireless communication system having at least one slave device, and a master device that is connected to the slave device and that has information of addresses allocated to the slave devices, the wireless communication device comprising:

a transceiving unit for receiving an external data, and transmitting a transmission-destined signal; and a controller which, when the wireless communication device is operated as a slave device connected to the master device and the slave device intends to communicate with another slave device, generates a packet where an address of a destination slave device received from the master device through the transceiving unit is recorded in a destination address region, wherein the destination region is in a header region of the packet, and transmits the packet through the transceiving unit to the destination slave device through the master device, wherein the controller records a source address in a payload region of the packet.

4. The device according to claim 3, wherein the source address is allocated by the master device.

5. A wireless communication device of a wireless communication system having at least one slave device, and a master device that is connected to the slave device and that has information of addresses allocated to the slave devices, the wireless communication device comprising:

a transceiving unit for receiving an external data, and transmitting a transmission-destined signal; and a controller which, when the wireless communication device is operated as a slave device connected to the master device and the slave device intends to communicate with another slave device, generates a packet where an address of a destination slave device received from the master device through the transceiving unit is recorded in a destination address region, and transmits the packet through the transceiving unit to the destination slave device through the master device, wherein the addresses are active member addresses which the master device allocates to distinguish the connected slave devices, and wherein the packet includes a destination address in a header region of the packet and a source address in a payload region of the packet.

6. A wireless communication device of a wireless communication system having at least one slave device, and a master device that is connected to the at least one slave device and that has information of addresses allocated to the at least one slave device, the wireless communication device comprising:

a transceiving unit for receiving an external data, and transmitting a transmission-destined signal; and a controller which, when the wireless communication device is operated as a master device connected to the at least one slave device, reads a packet received directly from said at least one slave device via the transceiving unit and transmits the packet directly to a corresponding slave device through the transceiving unit if there is an address of the corresponding slave device recorded in a destination address region of the packet, wherein the packet includes a destination address in a header region of the packet and a source address in a payload region of the packet.

7. The device according to claim 6, wherein the controller recognizes the address recorded in the header region of the packet as the destination address.

8. A wireless communication device of a wireless communication system having at least one slave device, and a master device that is connected to the slave device and that has information of addresses allocated to the slave devices, the wireless communication device comprising:

a transceiving unit for receiving an external data, and transmitting a transmission-destined signal; and a controller which, when the wireless communication device is operated as a master device connected to at least one slave device, reads the packet received from the transceiving unit and transmits the packet to the corresponding slave device through the transceiving unit if there is an address of the slave device recorded in a destination address region of the packet, wherein the controller recognizes the address recorded in a payload region of the packet as an address of the transmission slave device, wherein the packet includes a destination address in a header region of the packet and the source address in the payload region of the packet.

9. A wireless communication system having at least one slave device, and a master device that is connected to the slave device and that has information of addresses allocated to the slave devices, the slave device obtaining an address of the destination slave device from the master device, generating a packet including the address of the destination slave device as a destination address in a header region of the packet and the address of the slave device as a source address in a payload region of the packet, and transmitting the packet to the master device, and the master device reading the received packet, and transmitting the packet to the slave device of the destination address, when the address recorded in a destination address region of the packet is the address of the slave device.

10. The system according to claim 9, wherein the slave device records the address of the destination slave device in a header region of the packet, and the master device recognizes the information recorded in the header region of the packet as the destination address.

11. A wireless communication system having at least one slave device, and a master device that is connected to the slave device and that has information of addresses allocated to the slave devices, the slave device obtaining an address of the destination slave device from the master device, generating a packet including the address of the destination slave device as a destination address and the address of the slave device as a source address, wherein the packet includes the destination address in a header region of the packet and the source address in the a load region of the packet, and transmitting the packet to the master device, and the master device reading the received packet, and transmitting the packet to the slave device of the destination address, when the address recorded in a destination address region of the packet is the address of the slave device, wherein the slave device records its source address in the payload region of the packet.

12. The system according to claim 9, wherein the address is an active member address which the master device allocates to distinguish the respective slave devices.

13. A communication method for a wireless communication system having at least one slave device, and a master device that is connected to the slave device and that has information of addresses allocated to the slave devices, the method comprising the steps of:

obtaining an address of the destination slave device from the master device;

generating a packet including the address of the destination slave device as a destination address and the address of the slave device as a source address; and transmitting the packet to the master device so that the packet can be transmitted to the destination slave device through the master device according to the destination address recorded on the packet, wherein the packet includes the destination address in a header region of the packet and the source address in the payload region of the packet.

14. The method according to claim 13, wherein the address of the destination slave device is recorded in a header region of the packet.

15. A communication method for a wireless communication system having at least one slave device, and a master device that is connected to the slave device and that has information of addresses allocated to the slave devices, the method comprising the steps of:

obtaining an address of the destination slave device from the master device;

generating a packet including the address of the destination slave device as a destination address in a header region of the packet and the address of the slave device as a source address in a payload region of the packet; and transmitting the packet to the master device so that the packet can be transmitted to the destination slave device through the master device according to the destination address recorded on the packet, wherein the address of the transmission slave device is recorded in the payload region of the packet.

16. The method according to claim 13, wherein the address is an active member address which the master device allocates to distinguish the respective slave devices.

17. A communication method for a wireless communication system having at least one slave device, and a master device that is connected to the at least one slave device and that has information of addresses allocated to the at least one slave device, the method comprising:

the master device analyzing a packet received directly from a first slave device; and the master device transmitting the packet directly to a second slave device of a destination address, when an address recorded in a destination address region of the packet is the address of the second slave device, wherein the packet includes the destination address in a header region of the packet and a source address in the payload region of the packet.

18. The method according to claim 17, wherein the master device performs the analyzing and transmitting steps.

* * * * *